(No Model.)  2 Sheets—Sheet 1.
O. E. MELICHAR.
GUIDE AND ROUTE BOOK.
No. 424,326. Patented Mar. 25, 1890.
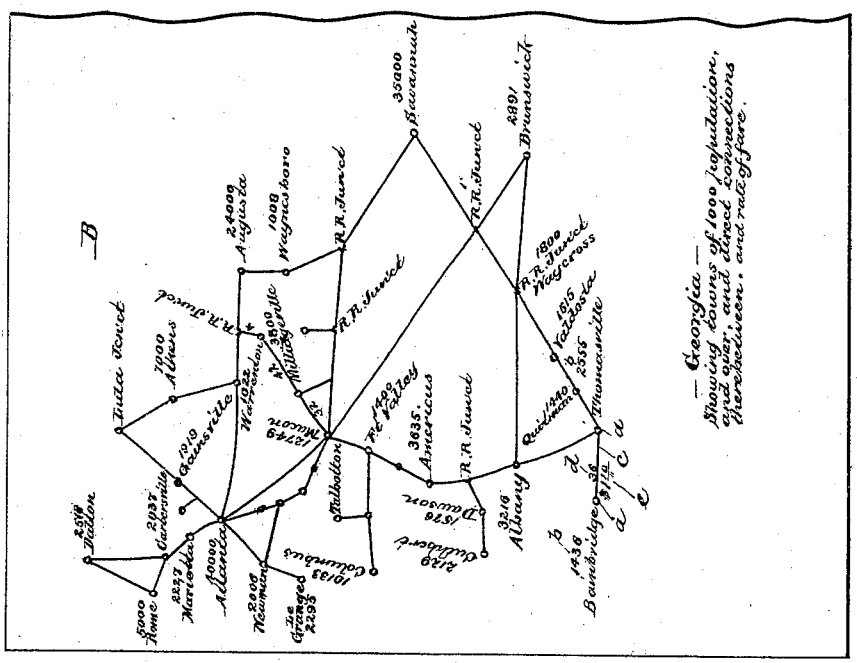
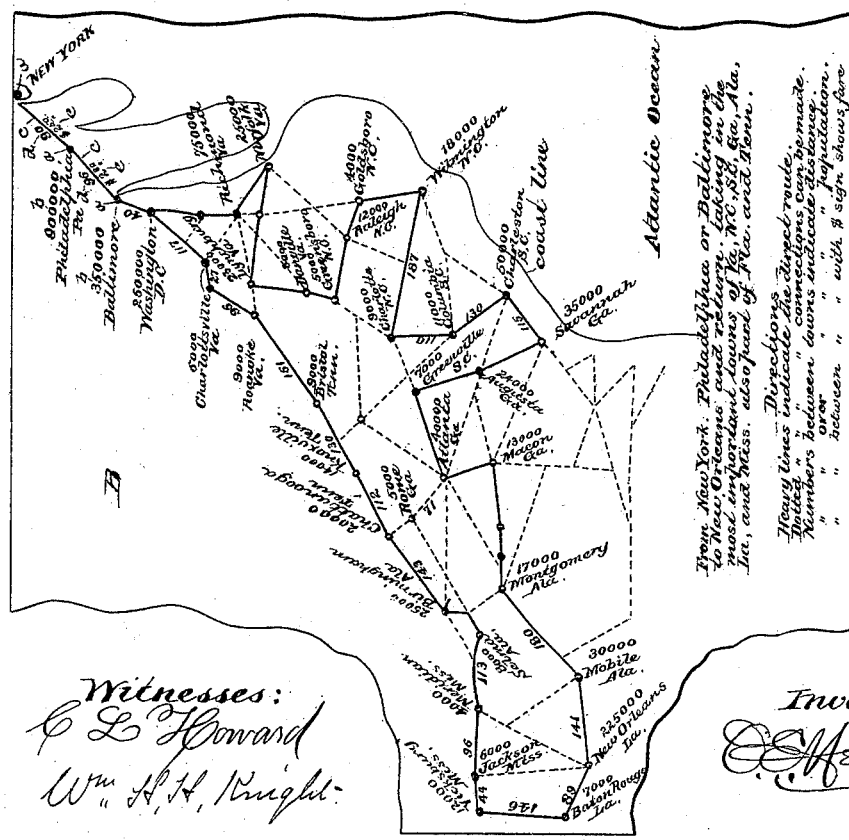
Witnesses:
C. L. Howard
Wm. H. H. Knight
Inventor:
O. E. Melichar (No Model.) 2 Sheets—Sheet 2.

O. E. MELICHAR.
GUIDE AND ROUTE BOOK.

No. 424,326. Patented Mar. 25, 1890.

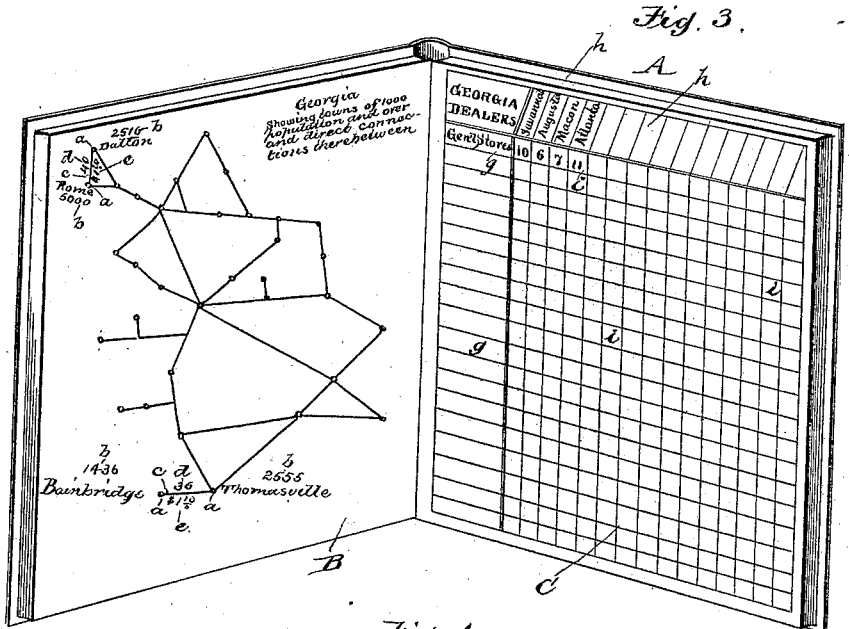

Fig. 3.

Fig. 4.

| GEORGIA DEALERS | Savannah | Augusta | Macon | Atlanta | Americus | Columbus | Rome | Albany | Dalton | Milledgeville | Cartersville | Darien | Brunswick |
|---|---|---|---|---|---|---|---|---|---|---|---|---|---|
| Gen'l Stores | 10 | 6 | 7 | 11 | 9 | 6 | 8 | 10 | 7 | 10 | 8 | 7 | 6 |
| Bakers | 9 | 7 | 6 | 15 | 10 | 3 | 6 | 2 | 3 | 2 | 1 | 2 | 3 |
| Grocers | 40 | 25 | 20 | 50 | 17 | 8 | 10 | 8 | 5 | 9 | 6 | 5 | 4 |
| Confectioners | 8 | 6 | 8 | 14 | 7 | 3 | 2 | 1 | 2 | 2 | 1 |  | 3 |
| Druggists | 15 | 11 | 10 | 18 | 7 | 3 | 5 | 2 | 3 | 2 | 1 | 2 | 1 |
| Boots&Shoes | 10 | 8 | 5 | 10 | 3 | 2 | 5 | 4 |  | 1 | 1 |  | 1 |
| Dry Goods | 9 | 7 | 3 | 6 | 2 | 3 | 2 | 1 | 1 | 2 | 1 | 1 | 2 |
| Fancy Goods | 12 | 5 | 4 | 4 | 1 | 2 | 3 | 1 | 2 | 1 | 2 | 1 |  |
| Millinery | 8 | 3 | 2 | 3 |  | 1 | 1 |  |  | 1 | 1 | 1 |  |
| Gents Furnishing | 7 | 5 | 3 | 2 | 1 | 1 | 2 | 1 | 2 | 1 |  | 1 | 1 |
| Tailors | 5 | 4 | 5 | 7 | 3 | 2 | 1 | 2 | 1 | 2 | 1 | 1 | 2 |
| Hardware | 8 | 6 | 6 | 10 | 3 | 2 | 2 | 3 | 3 | 2 | 3 | 2 | 1 |
| Wines & Liquors | 35 | 20 | 15 | 40 | 8 | 10 | 15 | 6 | 3 | 5 | 4 | 2 | 4 |
| Cigars | 20 | 15 | 12 | 30 | 9 | 6 | 5 | 3 | 4 | 5 |  |  |  |
| Painters | 7 | 5 | 7 | 10 | 6 | 4 | 8 | 2 | 5 |  |  |  |  |

Witnesses:
C. L. Howard
W<sup>m</sup> H. H. Knight

Inventor:
O. E. Melichar

United States Patent Office.

OSWALD E. MELICHAR, OF BROOKLYN, ASSIGNOR, BY DIRECT AND MESNE ASSIGNMENTS, TO GIBB BROTHERS & MORAN, OF NEW YORK, N. Y.

GUIDE AND ROUTE BOOK.

SPECIFICATION forming part of Letters Patent No. 424,326, dated March 25, 1890.

Application filed July 10, 1889. Serial No. 317,020. (No model.)

*To all whom it may concern:*

Be it known that I, OSWALD E. MELICHAR, a citizen of the United States, residing in the city of Brooklyn, county of Kings, and State of New York, have invented certain new and useful Improvements in Commercial Travelers' and Merchants' Special Route and Reference Books; and I hereby declare the following to be a full, clear, and exact description thereof, sufficient to enable others skilled in the art to which my invention appertains to make and use the same, reference being had to the annexed drawings, forming a part of this specification, and to the letters of reference marked thereon.

My invention relates to a special route and ready-reference book or pamphlet, which, while being, as is implied by the title by which it is known in the trade—namely, "Commercial Travelers' and Merchants' Special Route and Reference Book"—especially designed for and adapted to the use of merchants and commercial travelers, may yet be used with advantage to others than those of the above-referred-to callings.

The invention consists in a special route and ready-reference book or pamphlet wherein are set forth or delineated in a certain novel and peculiar manner the exact geographical positions of cities and towns having a certain population or over of a certain State or section of a country; the population of each of such cities and towns noted adjacent thereto and expressed, preferably, in figures; the most direct transportation routes or railways, indicated graphically by lines of a certain character, and also, if desired, the possible connections between such places, indicated, also, by peculiar distinctive lines, with the distances and fares therebetween noted near to the route-lines; the local commercial statistics of said cities and towns, enumerating the various business callings of the local dealers and merchants thereof and the number of separate firms or individuals engaged in such callings, each said diagram of a certain section of country or State having its particular and especially-arranged statistical table to be associated therewith, though they may be used independently, as each is complete in itself, so far as it goes, as will be fully understood from the specific description herein given and from the appended claims.

A type or sample of the invention, arbitrarily selected, is herewith illustrated for the more complete understanding of the same.

In the said drawings, in which like letters of reference designate like parts throughout, Figures 1 and 2 are views of my novel diagrams or geographical delineations representing, respectively, the Southern States in a group and the State of Georgia, as hereinafter explained. Fig. 3 is a perspective view of my improved book opened so as to display at a glance the complete geographical, railway, and statistical information of a certain section of country. Fig. 4 is an enlarged detached detail view, partly broken away, of a completely-filled-out statistical table like that shown on the right-hand page of the book in Fig. 3.

Referring to the drawings, A designates a book or pamphlet made up of suitable leaves, on conveniently-arranged parts of which, preferably upon opposite sides thereof in alternating order, are placed the peculiar statistical tables B and the geographical and route diagrams C, the order being preferably such that when the book is opened, as in Fig. 3, the left-hand page will display the diagram B and the right-hand page the diagram C. This geographical route, &c., diagram B, shows at *a* the cities and towns of a certain population and over, disposed in their proper geographical relation, with the names indicated at *b* and the population of each written over its name, preferably in figures, as shown. The most direct routes of transportation between the cities or towns are indicated by lines *c*, preferably solid lines, while the distances and fares therebetween are shown adjacent the route-lines at *d* and *e*, respectively, and, by preference, are shown in figures. The connections that may be made between the different cities and towns are indicated by distinctive broken lines, as will be fully understood from the drawings. Thus it will be seen that a person may ascertain by a cursory reading of the diagrams all the usual information required by the traveling public, with the exception of the railway-schedules, which, obviously, would be impracticable to illustrate in such a system.

The statistical tables C consist in a suitably-ruled sheet containing a series of spaces $g$, $h$, and $i$. Of these spaces those designated by the letter $g$ are adapted and designed to receive the titles or names of the various business callings—as, for instance, general stores, bakers, grocers, &c.—and they are preferably arranged in a vertical column at the left-hand side of the margin of the page. The spaces $h\,h$ are arranged at the top of the page, preferably, and are designed to contain the names of the cities and towns of a certain section of a country or a State—for instance, Georgia—having a certain population or over, and arranged, preferably, as near as possible in the order in which they are relatively situated over a general route. The lines forming these spaces are shown as inclined, so as to permit the names of the places to be disposed obliquely, in order to be more easily read. The spaces $i$ are for the numerals, setting forth the number of dealers or merchants in the various cities or towns engaged in particular callings, as fully shown in Fig. 4.

It is obvious that the view B may set forth the cities and towns of a single section of a country or a State, as shown in Fig. 2, wherein Georgia is illustrated, or those comprised in a number of adjoining States, as shown in Fig. 1, wherein the Southern States are illustrated. I therefore do not confine myself to either of such forms. Each page should bear in conspicuous letters the name of the State or section it pertains to, and, if preferred, each may bear the brief directions shown at the bottom of the pages in Figs. 1 and 2.

Each sheet constitutes an independent reference for the special matter it may contain, and therefore can be used independently; but by preference I use a diagram B and a table C conjointly, as shown in Fig. 3.

In the use of any of my improved sheets no reference to outside books or keys is required, since each part displays particular and complete information, and this I consider an important advantage, for it is undesirable in traveling to be compelled to go through a tedious search for the information required. The sheets are preferably put together in book form and arranged in definite order. The countries illustrated and statistically tabulated may be, of course, any country—for instance, the United States or Canada.

The book is a handy and useful article for any traveler, and it is especially useful to commercial travelers or drummers, since where it is desired to obtain certain information about a State or portion thereof the user may turn to a given page and see at a glance the towns, cities, and railroad connections therebetween, the distances, railway fares, and population, also the various local statistics of commercial importance, and thus be enabled to intelligently plan a trip and avoid traveling over the same ground twice, at the same time selecting the most desirable places for his especial business.

Having thus described my invention, what I claim, and desire to secure by Letters Patent, is—

1. In a special route and ready-reference book for merchants, commercial travelers, &c., a page or sheet containing diagrammatic views of cities and towns of a given population and over in any country, section, or State, arranged in their relative geographical positions, the population of said cities and towns being noted near by, and the most direct routes between the various places, the lengths of said routes, and the rates of fare thereon being also noted, substantially as described.

2. A special route and ready-reference book for merchants, commercial travelers, &c., comprising diagrammatic views of cities and towns of a given population and over in any country, section, or State, arranged in their relative geographical positions, the population of the several places being noted near by, and the most direct routes between the various places, the lengths of said routes, and rates of fare thereon also being noted, together with an accompanying statistical table setting forth by name said cities and towns, the various business callings followed therein, and the number of firms or individuals engaged in each of said callings, substantially as described.

O. E. MELICHAR.

Witnesses:
D. JOHN RITTERBAND,
PHILLIPS ABBOTT.